United States Patent [19]

Dunn et al.

[11] Patent Number: 5,651,054

[45] Date of Patent: Jul. 22, 1997

[54] METHOD AND APPARATUS FOR MONITORING A MESSAGE IN A VOICE MAIL SYSTEM

[75] Inventors: Paul M. Dunn, Bainbridge Island; Robert C. Greco, Seattle, both of Wash.

[73] Assignee: Active Voice Corporation, Seattle, Wash.

[21] Appl. No.: 421,382

[22] Filed: Apr. 13, 1995

[51] Int. Cl.$^6$ .............................. H04M 1/64; H04M 3/42
[52] U.S. Cl. .............................. 379/67; 379/89; 379/204; 379/210; 379/215; 379/376
[58] Field of Search .................. 379/67, 88, 89, 379/376, 84, 204, 210, 215

[56] References Cited

U.S. PATENT DOCUMENTS

| | | | |
|---|---|---|---|
| 4,853,952 | 8/1989 | Jachmann et al. | 379/88 |
| 4,926,462 | 5/1990 | Ladd et al. | 379/67 |
| 4,942,598 | 7/1990 | Davis | 379/57 |
| 5,029,196 | 7/1991 | Morganstein | 379/67 |
| 5,243,642 | 9/1993 | Wise, Jr. et al. | 379/82 |
| 5,327,486 | 7/1994 | Wolff et al. | 379/96 |
| 5,351,276 | 9/1994 | Doll, Jr. et al. | 379/67 |
| 5,361,295 | 11/1994 | Solomon et al. | 379/67 |
| 5,363,431 | 11/1994 | Schull et al. | 379/67 |
| 5,463,676 | 10/1995 | Ohsawa | 379/67 |
| 5,471,519 | 11/1995 | Howe et al. | 379/67 |

FOREIGN PATENT DOCUMENTS

| | | | |
|---|---|---|---|
| 63-74365 | 4/1988 | Japan | 379/88 |
| 63-139454 | 6/1988 | Japan | 379/89 |
| 1-248752 | 10/1989 | Japan | 379/89 |

OTHER PUBLICATIONS

"Introducing Message Monitor Model 400MM" (brochure).
"Voiceguide", BICOM brochure, 8 pages.
"BICOM 4LS Digital Voice Processing System" (brochure), two pages, Apr. 1991.

"CWD Feature Requirements", Dec., 1987; pp. 1-1, 2-1, 2-2 and 4-1-4-8 (Bellcore standard).
McNinch, "Screen Based Telephony", Apr. 1990 IEEE Communications Magazine, pp. 34-38.
"Call Waiting Deluxe Feature", Apr., 1993; pp. 1-4 (Bellcore Standard).
*Star Talk Set Up and Operation Guide*, Sec. 2, "Learning About StarTalk," pp. 1-7, Northern Telecom (undated).
"Getting the Message Just Got Easier," *StarTalk*, Northern Telecom. (brochure) © 1991.
Chris Schmandt and Stephen Casner, "Phonetool: Integrating Telephones and Workstations," *IEEE Communication Society*, IEEE Global Telecommunications Conference, Nov. 27-30, 1989, pp. 0970-0974.
"The CallXpress3 CallServer Family", Applied Voice Technology. (brochure), 11 pp. (undated).
"CallXpress3", Applied Voice Technology (brochure), 8 pp. (undated).
"The VMX Desktop Product", VMX, Inc. (brochure), 10 pp., © 1993.

(List continued on next page.)

*Primary Examiner*—Thomas W. Brown
*Attorney, Agent, or Firm*—Graybeal Jackson Haley LLP

[57] ABSTRACT

A telephone system with extension telephones and voice mail features allows an extension owner to monitor a message as it is being left in voice mail. The monitoring method may be implemented in a system with a simple extension telephone or with an extension including a second channel of communication to a display screen. If the monitoring begins later than the time when the caller began leaving the message, monitoring may commence at a midpoint of the message or, with a delay, from the beginning of the message, playing back at a rate faster than real time to catch up with real time. For extensions with a display screen, each call received by the system for the extension creates an entry in a call log for the extension and, for each such entry where a message was left, the called party may play back the message by selecting on the screen the call log entry for that call.

34 Claims, 6 Drawing Sheets

OTHER PUBLICATIONS

"Repartee", Active Voice Corporation. (guide), 155 pp., Mar. 1994.

"*OneView* for Windows", Centigram Communications Corporation. (brochure), 16 pp. (undated).

"Desktop for Windows", Applied Voice Technology. (brochure), 6 pp., © 1995.

"Integrated Desktop Messaging", Applied voice Technology (brochure), 4 pp. (undated).

METHOD AND APPARATUS FOR MONITORING A MESSAGE IN A VOICE MAIL SYSTEM

TECHNICAL FIELD

This invention relates to telephone switching systems with voice mail features.

BACKGROUND OF THE INVENTION

Voice mail systems allow a caller to leave a recorded voice message for a called party when the called party is unwilling or unavailable to take the call. Whether the voice mail system is deployed with a private branch exchange (PBX) switch or with a central office telephone switching system, one mailbox is assigned for each telephone extension. The voice mail system is much like an answering machine on each extension but with important advantages. A principal advantage is that the voice mail system will take a message when the called party is using the telephone. With an answering machine, if the called party is on the telephone, the caller receives a busy signal. An advantage of the answering machine is that the called party can allow the answering machine to answer an incoming call when the called party is present and the called party can then listen to the caller leave a message. If, while listening to the message, the called party wishes to speak to the caller, the called party can then pick up the telephone. A limitation of the answering machine is that this feature cannot be used if the called party is on the telephone with a third party. Another limitation is that if the called party was unavailable to hear the beginning of the message when the caller began to leave it, the called party cannot play the message from the beginning while it is being left by the caller.

SUMMARY OF THE INVENTION

The invention is a method and apparatus for a voice mail system to allow a called party to monitor a message being left by a caller while the called party is on the telephone with a third party. Then, if the called party wishes, the called party can instruct the voice mail system to interrupt the caller leaving a message by playing a prompt (greeting) offering to the caller the option of being connected to the called party. Alternatively, the called party can instruct the system to simply connect the caller to the called party without a pre-recorded interrupting prompt.

The system may be implemented with an ordinary telephone extension, which requires putting the third party on hold, or, preferably, with a second communication channel from the telephone switch system to the called party so that the called party can monitor a message being left by a caller in the voice mail box without first putting the third party on hold.

Preferably, the second channel is a local area network connected between the switching system with voice mail and a personal computer with a sound card and speakers at the location of the called party. Information concerning the call is displayed on the computer screen and the called party enters commands to the system at the computer rather than his telephone set. On the screen, many calls can be displayed at once. The called party can select which one of two or more callers leaving messages in voice mail at the same time the called party wishes to monitor. The called party can also select which of the callers the called party wishes to interrupt and speak with.

When the called party monitors the message, the system can be configured to begin playing the message immediately as it is left by the caller, skipping any part of the message that was already left when the called party begins to monitor, or, it can be configured to start playing the message from the beginning even if this creates a delay of five or more seconds compared to real time. When the message is played back with such a delay, it can be played back at a faster rate than real time so that, if the message is long enough, the monitoring by the called party will catch up to real time before the end of the message.

If the called party does not want to be required to use his hands to command that a message being left by a caller should be monitored, the system can be configured to automatically monitor each message as it is left without intervention by the called party.

On a personal computer screen, many calls are displayed at once and each call remains displayed after the call is completed, creating a call log. If the call was completed by the caller leaving a message in the voice mail box, the mail box message may be played back by the called party by selecting from the call log a call with a status of "Left message".

BRIEF DESCRIPTION OF THE DRAWINGS

FIGS. 3–3B show a flow chart showing the steps required for the alternative embodiment for use with a regular telephone and no second channel of communication.

DETAILED DESCRIPTION OF THE INVENTION

Figures 1, 2:
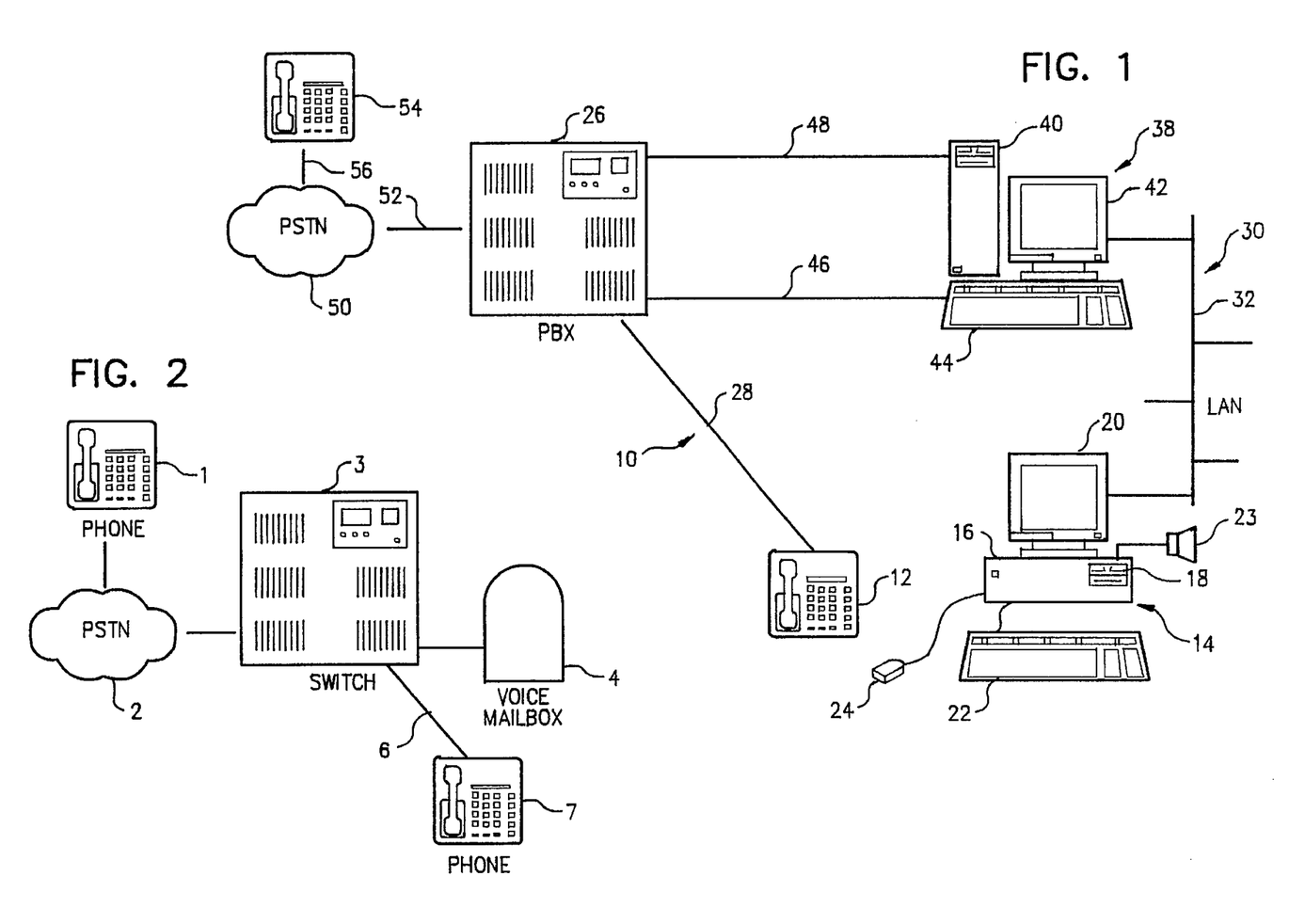
FIG. 1 is a schematic diagram showing a first embodiment for carrying out the invention.
FIG. 2 is a schematic diagram showing an alternative embodiment for use of one aspect of the invention with extensions which have only a regular telephone and no second channel of communication.

FIG. 1 is a schematic diagram showing a first embodiment for carrying out an aspect of the invention. The first embodiment of the apparatus 10 includes a user's telephone extension 12 and a programmed personal computer 14 located near the user's telephone extension 12. The programmed personal computer 14 includes a housing 16 that encloses a conventional microprocessor (such as an Intel 486 microprocessor, not shown) and other conventional electronic circuitry associated with the microprocessor. The housing 16 also encloses one or more disk drives, including a floppy disk drive 18 and a hard disk drive (not shown) that contains the client program which the microprocessor is executing as well as data which the program requires while it is executing. The programmed personal computer 14 also includes a display 20, a keyboard 22, a speaker 23 and a pointing device 24, such as a mouse. The display 20, the keyboard 22 and the pointing device 24 are all connected to the housing 16 through conventional cables (not shown).

When the user for the user extension telephone 12 is in the vicinity of the telephone 12 and the programmed personal computer 14, it is possible for the user to use the telephone 12, to operate the programmed personal computer 14 through the keyboard 22 and the mouse 24, and to observe the display 20. If the user is using the first embodiment of the claimed apparatus, the user can use the programmed personal computer 14 to see information concerning callers who are leaving messages in the user's voice mail box or calling the user's extension telephone 12 and to issue commands to the programmed personal computer 14 to handle the telephone calls by the callers.

The telephone 12 of the system 10 is connected to a private branch exchange (PBX) 26 through a first communication channel 28 that can carry the voice of a caller to the user (called party). The programmed personal computer 14 is connected to a local area network (LAN) 30 that includes an interconnecting bus 32 to which a call processor 38, configured to provide voice mail and a server, is connected. The programmed client personal computer 14 and the server communicate directly with each other using a client-server protocol, such as remote procedure calls, in accordance with conventional LAN operation. The communications protocol incorporates a remote procedure call (RPC) over Named Pipes or TCP/IP.

The call processor and server system 38 includes a programmed personal computer 40 with a voice board, such as supplied by Dialogic of New Jersey or Rhetorex of California (not shown), a display 42, and a keyboard 44 which are connected to the programmed personal computer 40 in a conventional manner. The personal computer 40 runs the IBM OS/2 operating system and is programmed to cause the call processor system 38 to function as a voice mail system. The voice board inside the computer 40, in turn, is connected to the PBX 26 through a bidirectional link 48 that carries telephone PBX signalling and voice data. Optionally, the call processor system 38 and the PBX 26 can also be interconnected with a bidirectional (OAI) digital link 46.

The bidirectional link 48, (with or without the OAI link 46), and the interconnecting bus 32 form a second, bidirectional communication channel that carries information between the telephone switch with voice mail system and the user.

The PBX 26 is connected to the public switched telephone network (PSTN) 50 through a standard telephone line 52. The telephone network 50 can be accessed by a caller from an outside telephone 54 through the line 56.

When in use, the system 10 (see FIG. 1) will operate as follows. A caller at the outside telephone 54 will dial the telephone number of the user, which will connect the outside telephone 54 to the telephone network 50 through the line 56. The network 50 will then connect the outside telephone 54 to the PBX 26 through the line 52. The PBX 26 will cause the caller on the outside telephone 54 to interact with the call processor system 38 which performs the functions of a voice mail system. If the caller is sent to voice mail by the system or by a person who received the call, the call processor 38 will begin to record a message and, at the same time, as a server, cause the client computer 14 to display appropriate information on its display 20 for the user to read.

FIG. 2 shows the components of a typical voice mail system for use with a simple telephone extension. The extension is connected to a switch 3 which may be either a PBX or a central office switch. Connected to the switch is a voice mail box 4 for the extension 7. The voice mail box system may be integrated with the switch equipment or embodied with a personal computer equipped with a Dialogic card as shown in FIG. 1. The switch is connected to the public-switched telephone network 2 which may be called by a caller at another extension 1.

Figures 3, 3A:
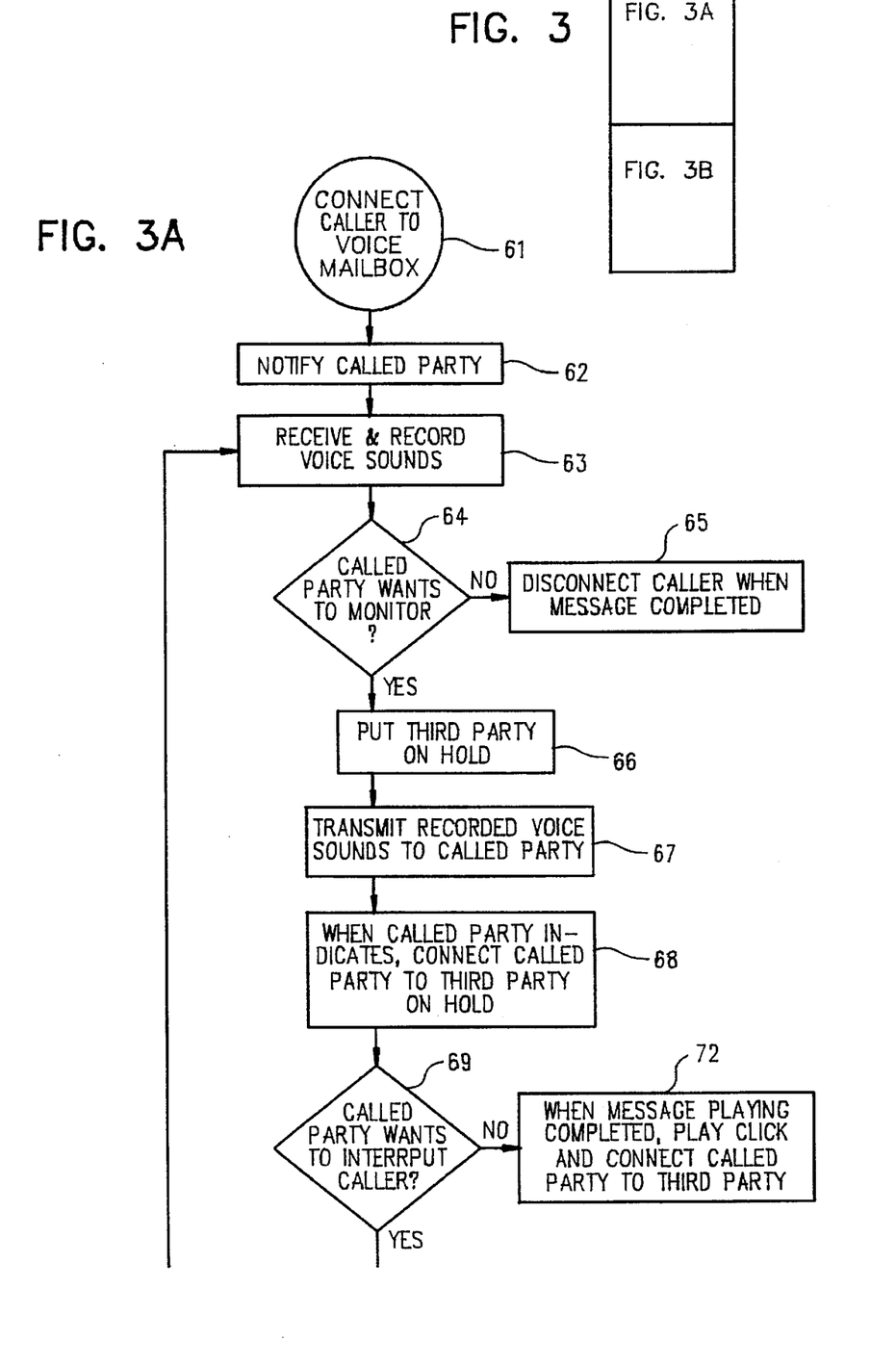
Figure 3B:
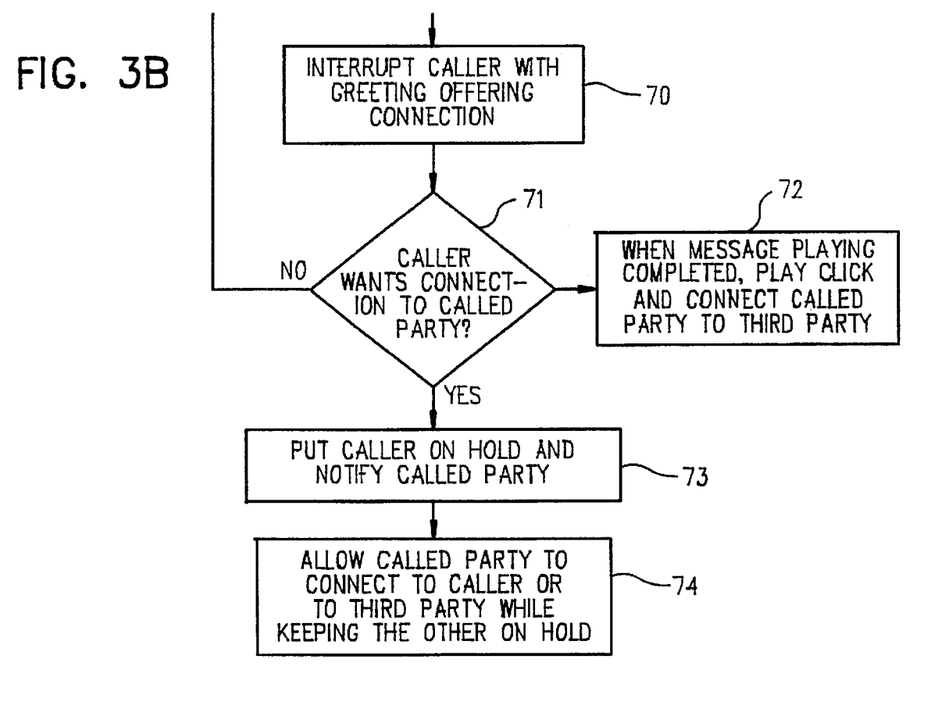

To implement the invention with a conventional switch with a voice mail box system, one must program the system to implement the logic shown in FIG. 3. If the system is composed of a PBX switch connected to a personal computer with a Dialogic card, all of the programming is done on the computer.

If the called party is on the line with a third party, when a caller is connected to the extension's voice mail box, step 61, the called party is notified with a distinctive sound on the called party's line 6. If the called party's telephone has a signalling display, a signal light can be illuminated or explanatory words can be shown on a character display. If the called party is not on the line 6 when a caller is connected to the voice mail box, the caller's telephone is caused to ring with a distinctive ring.

While the called party is being notified, step 62, the voice mail box sub-system begins to receive and record the voice sounds. The switch system then monitors for a DTMF tone, hook flash signal, or a dedicated or programmable button signal from the called party indicating that the called party wants to monitor the message being recorded, step 64. If the called party does not indicate that he wishes to monitor the recording, the caller is merely disconnected when the message is completed, step 65.

If the called party indicates that he wants to monitor the message, the third party is put on hold, step 66, and the recorded message is transmitted to the called party, step 67. The system may be configured to transmit the message from its beginning or from the point in real time when the called party begins to monitor. Because the original voice data is converted from analog to digital and accumulated in a 1K buffer on the voice board before being recorded to the disk and available for playback to the called party, even when listening in "real time", there is always a delay of at least ⅓ of a second. If the system is configured to transmit the message from its beginning and the called party responded quickly to the notification that a caller was sent to voice mail, he may begin hearing the recorded message with less than one second delay. However, if he responded more slowly, he may hear the recorded message with a delay of five or more seconds from the time it was recorded.

Because the voice mail message is recorded digitally, it may be played back at a faster rate than real time without a proportional increase in pitch. The Dialogic voice board which converts the recorded digital signal to analog for transmission to the extension telephone includes this capability. Therefore, in the default configuration of the system, monitoring of messages always starts at the beginning of the message. If the called party starts monitoring with more than 4 seconds delay, the message is played back with a 50% increase in playback rate so that, if the message is long enough, the monitoring will soon catch up to real time (⅓ second delay). If the called party starts monitoring with a delay of less than 4 seconds, the message is played back with a 30% increase in playback rate until it catches up to real time.

At any time, the called party can indicate with DTMF tones or a hook flash that they wish to be re-connected to the third party now on hold, step 68. Also at any time, if the called party wants to interrupt the caller, he may so indicate with DTMF tones, a hook flash, or the press of a special button, step 69. If the called party does not indicate that he wants to interrupt the caller, as soon as the playing message is completed, an auditory click is transmitted to both the called party and the third party to alert them both that they are being re-connected, and the two are connected, step 72.

If the called party indicates that he wants to interrupt the caller, the caller is interrupted with a tone and a greeting asking if the caller wants to finish leaving his message or wants to be connected to the called party, step 70. The system then waits for the caller to indicate with DTMF tones or voice recognition whether or not he wishes to be connected to the called party. In lieu of steps 70 and 71, the system may be programmed to directly connect the caller with the called party, following a warning click to both of them, when the called party indicates that he wants to interrupt the caller, step 69. In this case, when the two parties are connected, the logic skips steps 70, 71, and 73 and goes straight to step 74.

If the caller does not want to be connected to the called party, the voice mail box resumes recording the message, step 63, and the caller is disconnected when the message is completed, step 65. If the caller wishes to be connected to the called party, he is placed on hold and the called party is notified that the caller is on hold, step 73. If, after indicating that he wanted to interrupt the caller at step 69, the called party then requested a connection to the third party on hold as provided by step 68, he may complete his conversation with the third party on hold and then take the call from the caller on hold or he may place the third party on hold while he takes the call from the caller, step 74.

As can be seen from the above description, when the system is implemented with a single communication line to the called party, the system is rather complicated for the called party to operate. To simplify the operation, the called party may be given a second channel for communication with the switch and voice mail system as shown in FIG. 1. The simplified operation using the hardware of FIG. 1 is shown in the flow chart of FIG. 4.

Figure 4:
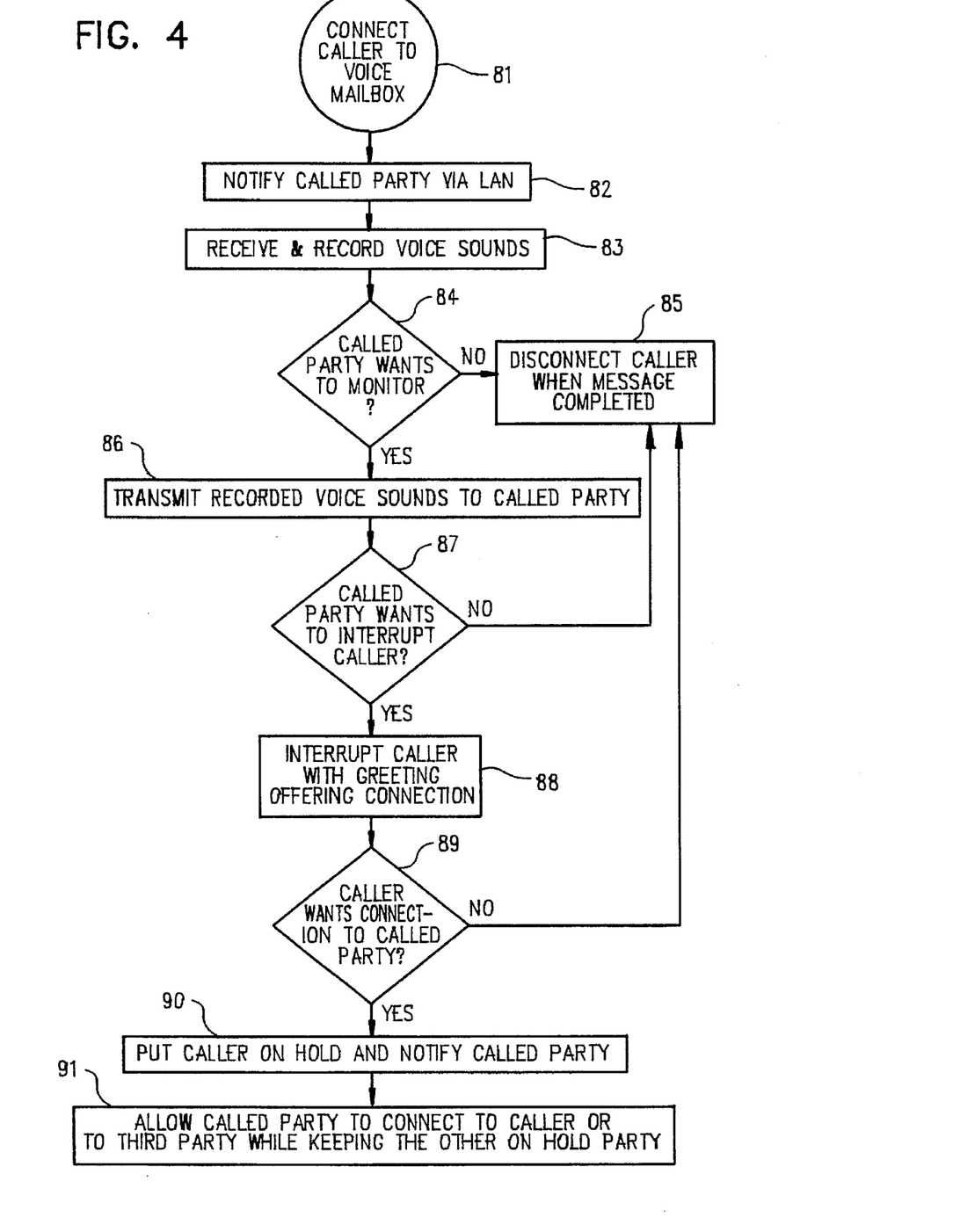
FIG. 4 shows a flow chart analogous to FIG. 3 for use with the first embodiment which includes a second channel of communication.

In FIG. 4, when a caller is connected to a called party's voice mail box, step 81, the system sends a notification to the called party via the local area network, step 82, and begins recording the caller's message in the mail box, step 83.

Figure 5:
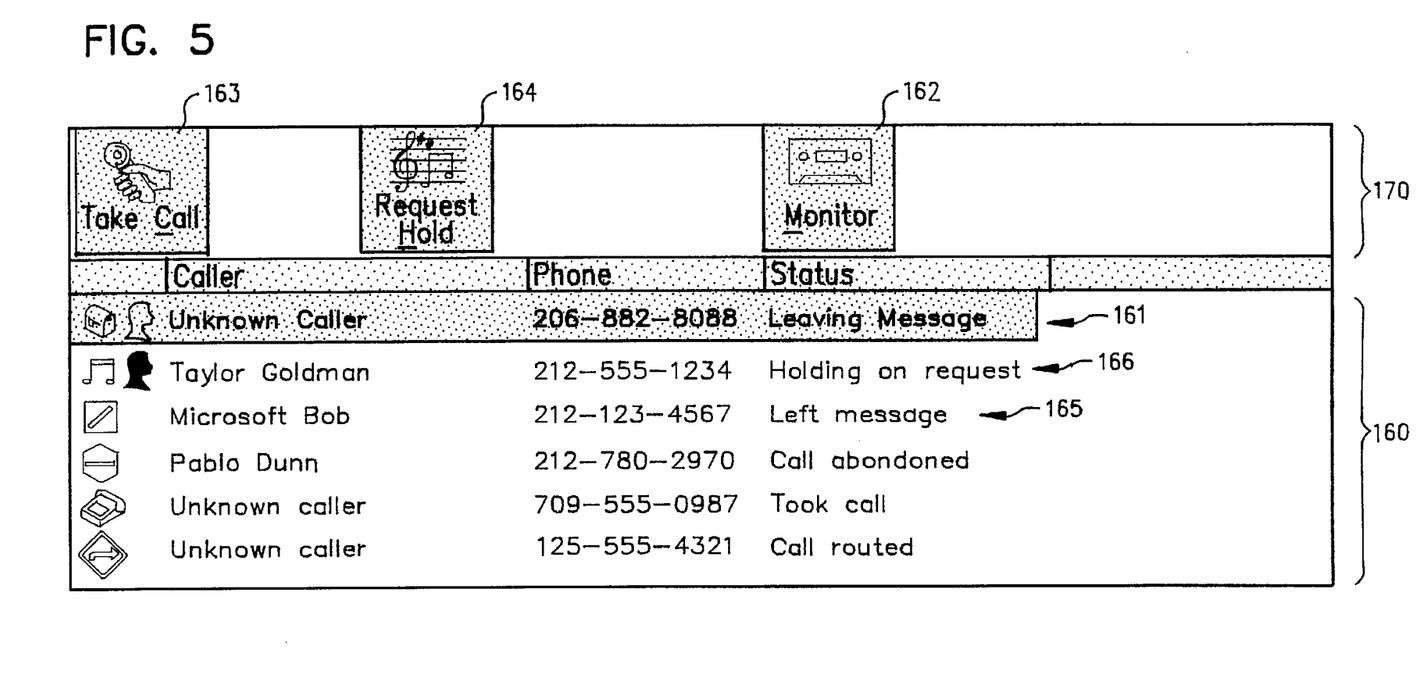
FIG. 5 is a view of a window which is produced in the use of the apparatus of the first embodiment for carrying out an aspect of the invention.

When the called party's personal computer receives the notification of a caller leaving a message in the voice mail box, the personal computer displays a line of information 161 in a call information field 160 as shown in FIG. 5. The words displayed are "Leaving message". The screen display shown in FIG. 5 displays information about all calls to the system directed to the called party's extension. For any displayed call where the status of the call is "Leaving message" as shown in the first line 161 of the call information field 160, or "Left message" as shown in the third line 165, the message can be monitored.

Within the display, a tool bar 170 shows each of the functions that can be performed with respect to any call in the call information field 160 which has been highlighted by the user. When the called party wishes to monitor a message left in the called party's voice mail box 4, by using the pointing device 24, the user can select the icon representing a cassette tape and labelled "Monitor" 162 to hear through the speaker 23 a reproduction of the message.

Selecting the "Monitor" feature allows the called party to hear the message left by the caller, whether or not the caller has finished leaving the message. If the caller is still leaving the message, the status will be displayed as "Leaving message" and the called party can interrupt the caller. If the caller has finished leaving the message, the status will be displayed as "Left message" and it is too late for the called party to interrupt the caller.

When the called party selects the "Monitor" tool from the tool bar, step 84 of FIG. 4, the system begins transmitting the recorded voice sounds to the called party, step 86, and they are played on the speaker 23 connected to the personal computer. The user may configure the system to begin playing each recorded message from the beginning of the message or from the point in real time at which the called party chose to begin monitoring to minimize the delay between what the called party is hearing and what the caller is saying. At any time as the message is playing, the called party may select on the tool bar either an icon labelled "Take Call" 163 or an icon labelled "Request Hold" 164, step 87. With the default configuration of the system, either of these options causes the system to interrupt the caller with a greeting (prompt) which offers a connection to the called party, step 88. The "Request Hold" option plays a greeting offering the caller to be put on hold for the called party and the "Take Call" option plays a greeting offering the caller to be connected to the called party. If the called party selected "Take Call" and the caller indicates by DTMF tones that the caller wants to be connected with the called party, step 89, the connection is made at that point. If the called party selected "Request Hold" 164 and the caller indicates by DTMF tones that the caller wants to be put on hold, the processing continues to step 90, the caller is put on hold, and the called party is notified by a change in the status column of the call information field 160 to "Holding on request" as shown on the second line 166. Processing then continues to step 91 which allows the called party to put the third party on hold and take the call from the caller and, at any time, switch back by putting the caller on hold with the "Request Hold" button 164.

If the monitoring by the called party is delayed from the recording of the message, the called party will want to promptly send the "Take Call" or "Request Hold" command to the system for the system to interrupt the caller before the caller completes leaving the message and hangs up. While the caller is being interrupted with a greeting from the system, the called party will continue to hear the message left by the caller. If the called party selected "Take Call", the time it takes for the greeting to play to the caller and the time required for the caller to respond before the connection is made may be enough for the called party to hear the rest of the message. If it is not, the called party may wait until the message is done before picking up the phone.

If the called party does not indicate that he wants to interrupt the caller at step 87, or if the caller indicates that he does not want to be connected to the called party at step 89, the caller is disconnected when he has finished leaving his message, step 85.

Instead of configuring the system to interrupt the caller with a greeting, the system may be configured to promptly connect the caller when the called party selects "Take Call". If there is a delay between the recording of the message by the caller and the monitoring of the message by the called party, this will cause the called party to miss a portion of the message that was left equal to the delay. In this configuration, in FIG. 4, the logic jumps from step 87 to connecting the caller to the called party and, if the called party was already talking with a third party, putting the third party on hold.

When sounds come from the PBX on voice line 48, the speech is transformed to digital form under the Dialogic adaptive differential pulse code modulation (ADPCM) algorithm (available from Dialogic Corporation, Parsippany, N.J.) and stored in a 1K buffer on the Dialogic board. The standard size for this buffer is 8K, but, to minimize the delay, in one embodiment of the invention, the buffer is reconfigured to 1K. When the buffer is full, its contents are written to a file, opened under the operating system for both read and write, on the hard disk in the server using a first thread of the server software. For transmission across the network after a message has been left, the voice data is read off the hard disk by a second thread of the server software. The speech file is then received by the user's personal computer 14, converted to the file format known as the Waveform audio file format specification provided by Microsoft Corporation, and played according to the multimedia file format specifications of the Microsoft Windows environment. These file format specifications are described in the Multimedia Programmer's Reference, available from the Microsoft Corporation, Redmond, Wash.

The sound data received by the client was sampled at 6000 Hz and may be easily converted from digital to analog at the same rate. If the sound card in the personal computer can operate at this rate, no interpolation is required. Many sound cards cannot operate at this rate, but can operate at 11,025 Hz. In this case, the data is interpolated to produce sound data suitable for conversion from 11,025 Hz.

Figure 6:
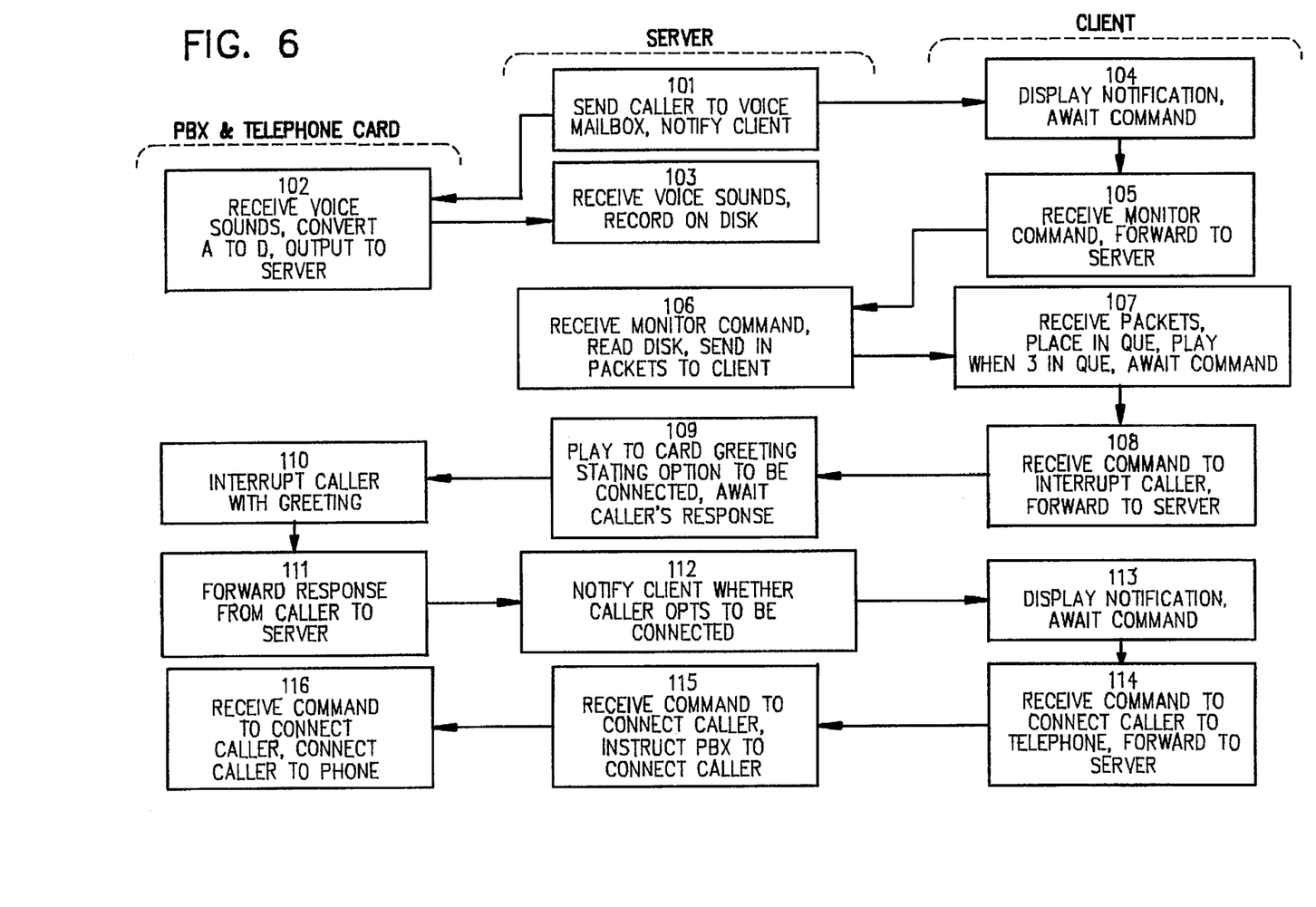
FIG. 6 shows the relationship between the principal operational steps performed by sub-components of the system.

FIG. 6 shows the operations performed by various components of the system when a called party monitors a message being left, interrupts the caller to put the caller on hold (or take the call), and then takes the call. The first column describes the functions performed by the PBX 26 and the telephone card (Dialogic voice board) in the server computer 40. For purposes of designing the software to control the components of the system, these two components should be thought of as a single component which interacts with the server software which is also running on the server computer 40. The functions of the server software are described in the middle column. The functions of the client software in the user's personal computer 14 are described in the third column.

The process starts when the server sends the caller to the called party's voice mail box, step 101, and instructs the telephone card to receive the message from the caller. At the same time, the server notifies the client that the caller is being connected to the voice mail box, step 101, and specifies the ID of the file in which the message will be recorded. At step 102, the telephone card receives the voice sounds from the caller, converts the signal from analog to digital, and outputs the voice sounds to the server. Although the A to D conversion could be at any sampling rate between 2000 Hz and 44,000 Hz, the voice board used in the first embodiment samples at a rate of 6000 Hz. The voice data is output by the voice board in packets of 1K each as soon as a 1K buffer on the voice board is filled, which requires about 3 tenths of a second. This is one component of the minimum delay that the called party monitoring the call will hear because the server cannot begin recording the voice data, step 103, until the first packet is received. The delay may be reduced by reducing the size of each packet output by the voice board. At step 103, the server receives the voice sounds in 1K packets from the telephone card and records them on the disk in the file whose ID was already provided to the client.

At step 104, upon receiving notification from the server, the client displays the notification to the called party, step 104, with the status notation "Leaving Message", and awaits a command from the user. Upon receiving from the user a command to monitor the message, step 105, the client software forwards the command to the server. Upon receiving the monitor command, step 106, the server software uses a second thread to read the disk as each 1K packet is recorded and sends the packets across the network to the client. At step 107, upon receipt of the packets, the client places the packets one after another in a buffer. In the standard configuration, each packet transmitted on the network contains enough data for about ⅓ of a second of playing.

If the client begins to play the sound data upon arrival of the first packet, it may run out of data to play because of delays due to heavy network traffic. Therefore, it waits to begin playing until there are three packets in the queue, for a minimum total delay of about one second. This is a sufficient quantity of packets in the queue to avoid gaps during playback in most circumstances. The number of packets in the queue or the size of each packet can be changed if the user experiences gaps.

In the standard configuration, when the called party wishes to monitor a message, a message is played from the beginning even if the called party begins to hear the message with a substantial delay. In this circumstance, like for the embodiment described above for extensions with only a simple telephone, it is desirable to play the message faster than real time so that the called party can catch up to real time (one second delay). To achieve this result, the standard design for a sound card is modified to add the capability of a Dialogic voice board so that the sound data can be played back at an increased rate without a corresponding increase in pitch at up to 50% faster than real time. To adjust the playback speed, the client software observes the number of packets in the queue. Whenever the number of packets in the queue is greater than twelve, about four seconds' worth in real time, the playback rate is increased by 50%. When the number of packets in the queue is between eight and twelve, inclusive, the playback rate is increased by 40%. When the number of packets in the queue is between four and seven, inclusive, the playback rate is increased by 30%. If the number of packets in the queue is three or fewer, the playback rate is set to real time. By this method, if the message is long enough, the called party's monitoring will catch up to real time before the message is completed. To indicate to the called party the amount of delay between the playback and the real time recording, a bar graph showing the amount of delay is constantly displayed on the called party's computer screen. The above-described automatic catch up method is only employed when the status notification provided by the server to the client is "Leaving a message". If the status is "Left message", the client plays the voice mail message at the default setting set by the user, which may be anywhere between real time and 50% faster than real time.

At step 107 in FIG. 6, the client continues to play the message and awaits further commands. Upon receipt from the called party of a "Request Hold" command to interrupt the caller, the client forwards the command to the server, step 108. If, instead, the called party selects "Take Call" and the system is configured to connect the caller without a greeting giving the caller an option to continue leaving a message, the caller is then connected. Otherwise, processing proceeds to step 109.

At step 109, the server plays to the telephone card for transmission to the caller a greeting giving the caller the option to be connected to or put on hold for the called party. At step 110, the PBX and telephone card play the greeting to the caller. At step 111, the PBX and telephone card forward the caller's DTMF tone response to the server. If the caller wants to be connected, at step 112, the server forwards to the client a notification that the call is being connected. If the caller wants to be put on hold, at step 112, the server forwards to the client a notification that the caller is holding on request. At step 113, the client displays the status in the caller information field 160 as "Connecting" or displays the status in the caller information field 160 as "Holding on request" and awaits further command from the called party. At step 114, the called party gives to the client a command to connect the caller to the called party's telephone. The client forwards the command to the server. At step 115, the server receives the command to connect the caller and, via the telephone card, instructs the PBX to connect the caller. At step 116, the PBX receives the command from the server and connects the caller to the telephone of the called party.

Some users may wish to always monitor all voice mail messages as they are left. For this reason, the system can be configured by the user to automatically monitor each message without a request by the user for monitoring. In this embodiment, in FIG. 4, at step 84, the flow always proceeds to step 86. In FIG. 6, once notification is received by the client at step 104, the client automatically forwards a command to monitor the message per step 105 without receiving such a command from the user.

Referring again to FIG. 6, at step 105, whenever the client receives from a user a command to monitor a mail box message, whether or not the caller has finished leaving the message, the processing proceeds as indicated through steps 106 and 107. If, before the user inputs a command to interrupt the caller, the status of the call changes from "Leaving Message" to "Left Message", the called party no longer has the options to take the call or request the caller to hold. In this case, the processing stops at step 107 and does not proceed to step 108 because the command options are no longer available to the called party.

In conventional voice mail systems, a caller interacts with the system through a "conversation" which consists of voice playback from the voice mail system and DTMF, voice, or other input from the caller. The conversation consists of individual "states" where each "state" is a single exchange between the voice mail system and the caller (the voice mail system plays a prompt to the caller, and the caller optionally responds with a DTMF or voice command). The conversation proceeds through these states according to a pre-defined sequence, allowing for control of the system by the caller. This sort of operation is well understood and widely used in voice mail systems today.

A complication arises with the introduction of a second channel of communication from the voice mail system to the called party. This introduces the possibility that the called party may, via the second channel, interrupt the ordinary flow of the conversation and direct the voice mail system to say something different to the caller at any time, effectively instructing the voice mail system to move directly to a different state than it otherwise would.

Figure 7:
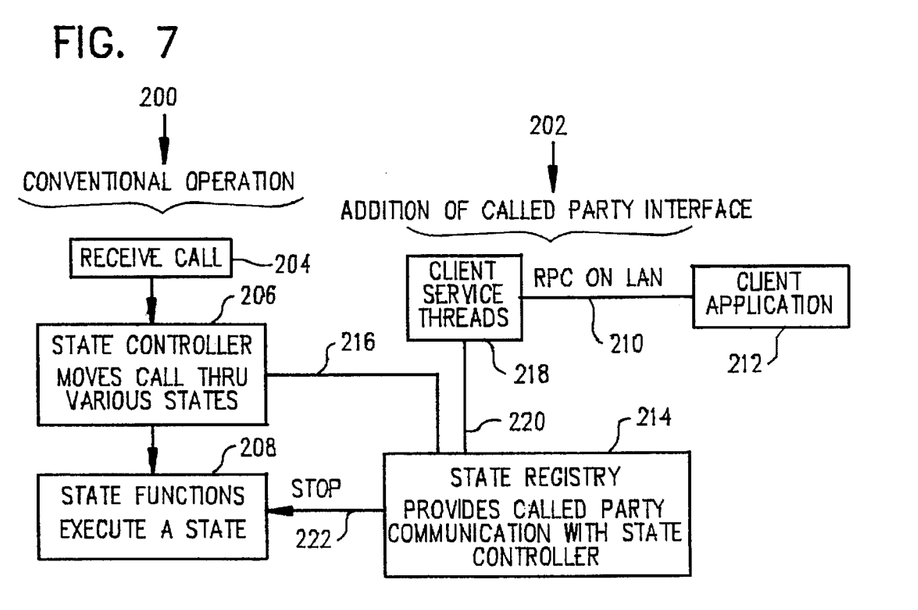
FIG. 7 is a schematic diagram of the operation of a conventional voice mail system together with the operation of the additional system for coordinating the called party commands with the on-going conversation.

FIG. 7 is a schematic diagram of the operation of a conventional voice mail system 200 together with the operation of an additional system 202 for coordinating the called party commands with the on-going conversation.

In the conventional voice mail system 200, the call is received (block 204), and the conversation is controlled by some state controller 206 which calls various state functions (block 208) to execute individual states with the caller. Each state function 208 performs its task and returns the results to the state controller 206. The state controller 206 determines which state to execute next, based on the pre-defined sequence of the conversation and the results of the previous state.

The first requirement for the added called party interface 202 is some form of communication link from the caller to the called party. In the first embodiment, the communications link to the called party is accomplished via Remote Procedure Calls (RPC) 210 over a Local Area Network (LAN) to an application program running on the called party's personal computer (PC) 212.

The application on the PC 212 can then interact with the voice mail system 200 via an Application Programming Interface (API) described below. The called party API includes the functions described below which meet three requirements:

1) To allow a called party to "log on to" or "establish a session with" the voice mail system 200 to indicate that the called party wants to be notified of transfers to the voice mail box and optionally to send the voice mail system 200 commands to handle the call(s), and to "log out" or "terminate a session."

2) To notify the called party of transfers to the voice mail box and continue to notify the called party of the progress of the call through various states. When a session is established, the called party application registers the address of a callback function with the voice mail system 200. The callback function is used by the voice mail system 200 to notify the called party about transfers to the voice mail box and call states. The voice mail system 200 invokes the callback function each time a call for the called party enters a new state. Each notification includes a "call handle" to identify the call to which the notification applies. When the called party application first sees a new call handle, it logs a new call. The notification also includes a value indicating the current state of the call.

3) To allow the called party to send commands to the voice mail system 200 to affect the flow of the caller conversation, such as a change state command. Commands from the called party application to the voice mail system include a pointer to a call handle, a value indicating the state the called party wishes to move the call to, and a pointer to a block of parameters with additional information about the state to be moved to, such as an indication of which of several greetings the called party would like to have played to the caller.

All of the functions in the API return a success code to indicate that the function succeeded or a failure code to indicate the function failed and the reason for the failure. Each of these codes has a defined meaning for each function. For example, the change state command returns zero (0) to indicate the command was accepted by the voice mail system 200, one (1) to indicate that the command was rejected by the voice mail system 200 because the call has terminated (the caller hung up), or other values to indicate other reasons for the command being rejected by the voice mail system 200, or other reasons for failure of the function, such as the LAN communication being lost.

The coordination of the called party interface with the conventional conversation interface is accomplished through a "state registry" object 214. Whenever a called party establishes a session with the voice mail system 200, the state registry object 214 logs that called party in to be notified of any calls and any call state changes for that called party.

The state controller 206 in the conventional conversation notifies the state registry object 214 of each new call received and each state transition for each call (path 216). At the conclusion of each call state, the state controller 206 also queries the state registry object 214 to see if the called party has requested a state change.

When the state registry object 214 receives notification of a call state change from the state controller 206, it checks whether the called party has established a session to receive call notification. If so, it invokes the callback function to notify the called party of the call state change, using a separate "client service thread" 218 (via path 220), to avoid holding up the execution of the state controller's process.

When the state registry object 214 receives a request to change the state of a call from the called party (via the client service thread 218), the state registry object 214 stores the state change request and delivers it to the state controller 206 when the state controller 206 queries for it at the conclusion of the current call state.

In order to speed the execution of called party state change requests, the state registry object 214 may also send a signal or command to the function executing the current state (path 222) to tell it to stop executing the current state and return immediately to the state controller 206.

This structure of separate client service threads 218 and the separate state controller 206 communicating via the state registry object 214 allows the called party RPC interface 210 and the caller conversation to proceed independently, but also allows for coordination of called party commands with the caller's conversation.

While the foregoing description has explained the method of alternative embodiments of the invention in detail, those skilled in the art will appreciate that there are a number of other embodiments for accomplishing the method and apparatus of the present invention. Accordingly, the scope of the invention is to be determined only by the following claims.

We claim:

1. A method, in a telephone switching system with a voice mail box for a called party's extension, for the system to transmit to the called party a voice mail message being left by a caller while the called party is using a first communication channel for a call with a third party and allow the called party to cause the system to interrupt the caller, comprising:
   (a) connecting the caller to the voice mail box,
   (b) receiving voice sounds of the voice mail message from the caller,
   (c) recording the voice sounds in the mail box,
   (d) while the voice sounds are being recorded, transmitting at least part of the voice sounds to the called party via a second communication channel,
   (e) receiving from the called party via the second communication channel a command to interrupt the caller leaving a message, and
   (f) interrupting the caller leaving a message with one of (i) a connection to the called party or (ii) a recorded greeting offering to connect the caller to the called party.

2. The method of claim 1 wherein the system notifies the called party that the system is receiving and recording voice sounds of the voice mail message from the caller and the system awaits a command from the called party before the system transmits the voice sounds to the called party.

3. The method of claim 1 wherein the second communication channel comprises a connection to a personal computer at the location of the called party and the voice sounds are played to the called party via a speaker connected to the personal computer.

4. The method of claim 1 further comprising:
   (a) while the called party is using the first communication channel for a call with a third party and voice sounds of the first caller are being transmitted to the called party, receiving a call from a second caller, receiving second voice sounds of a voice mail message from the second caller, recording the second voice sounds in the mail box, and
   (b) after at least part of the voice sounds of the first caller have been transmitted to the called party, transmitting to the called party at least part of the second voice sounds being left by the second caller.

5. The method of claim 4 further comprising:
   (a) receiving from the called party via the second communication channel a selection between the first caller leaving a message and the second caller leaving a message as to which caller should be interrupted.

6. A method, in a telephone switching system with a voice mail box for a called party's extension, for the system to transmit to the called party a voice mail message being left by a caller while the called party is using the extension for a call with a third party, comprising:
   (a) connecting the caller to the voice mail box,
   (b) transmitting to the called party a signal that a message is being recorded in the voice mail box,
   (c) receiving voice sounds of the voice mail message from the caller and recording the voice sounds in the mail box,
   (d) receiving from the called party a command to put the third party on hold,
   (e) putting the third party on hold,
   (f) while the voice sounds are being recorded, transmitting at least part of the voice sounds to the called party;
   (g) receiving a call from a second caller, connecting the second caller to the voice mail box, and transmitting to the called party a second signal that a message is being recorded in the voice mail box, and
   (h) transmitting to the called party at least part of the voice sounds of the second caller.

7. A method, in a telephone switching system with a voice mail box for a called party's extension, for the system to transmit to the called party, with a delay, a voice mail message being left by a caller, comprising:
   (a) receiving voice sounds of the voice mail message from the caller and recording the voice sounds in the mail box,
   (b) notifying the called party that the system is receiving and recording voice sounds of the voice mail message from the caller
   (c) receiving a command from the called party to play the voice sounds, and
   (d) while the voice sounds are being recorded, but with a delay of more than 1 second from the time that the voice sounds were received from the caller, playing at least part of the recorded voice sounds to the called party.

8. The method of claim 7 wherein the system is connected to a personal computer at the location of the called party and the voice sounds are played to the called party via a speaker connected to the personal computer.

9. The method of claim 7 further comprising:
   (a) while voice sounds of the caller are being transmitted to the called party, receiving a call from a second caller, receiving second voice sounds of a voice mail message from the second caller, recording the second voice sounds in the mail box, and
   (b) after at least part of the voice sounds of the first caller have been transmitted to the called party, transmitting to the called party at least part of the second voice sounds being left by the second caller.

10. A method, in a telephone switching system with a voice mail box for a called party's extension, for the system to transmit to the called party, with a delay which shrinks over time, a voice mail message being left by a first caller, comprising:

(a) receiving voice sounds of the voice mail message from the caller and recording the voice sounds in the mail box, and (b) beginning with a substantial delay from the time that the voice sounds were received from the caller, playing at least part of the recorded voice sounds to the called party at a rate faster than they were recorded, thereby reducing the delay as the message is played, at the same time that the voice sounds are being received.

11. The method of claim 10 wherein the system also notifies the called party that the system is receiving and recording voice sounds of the voice mail message from the caller and the system awaits a command from the called party before the system transmits the voice sounds to the called party.

12. The method of claim 10 wherein the system is connected to a personal computer at the location of the called party and the voice sounds are played to the called party via a speaker connected to the personal computer.

13. The method of claim 10 further comprising:

(a) while voice sounds of the first caller are being transmitted to the called party, receiving a call from a second caller, receiving second voice sounds of a voice mail message from the second caller, recording the second voice sounds in the mail box, and (b) after at least part of the voice sounds of the first caller have been transmitted to the called party, transmitting to the called party at least part of the second voice sounds being left by the second caller.

14. A method, in a telephone switching system with a voice mail box for a called party with an extension, which extension includes a multi-item display, for the system to transmit to the called party a voice mail message left by a caller, comprising:

(a) receiving a plurality of calls directed to the called party's extension, including a first call from a first caller and a second call from a second caller, and, for each of the plurality of calls, transmitting to the called party's extension's display items identifying the call, (b) connecting the first call to the called party's extension, (c) connecting the second call to the called party's voice mail box, (d) receiving a set of voice sounds of a voice mail message from the second caller, recording the set of voice sounds in the mail box, and storing in a memory an association between the set of voice sounds and the items displayed on the called party's extension's display for the call from the second caller, (e) displaying on the called party's extension's display a list comprised of each of the items transmitted to the extension for each of the plurality of calls directed to the called party's extension, including the first call and the second call, (f) receiving at the called party's extension a selection by a user of the displayed items for the second call, and (g) transmitting the set of voice sounds corresponding to the selected items to the called party's extension.

15. The method of claim 14 wherein the system is connected to a personal computer at the location of the called party and the voice sounds are played to the called party via a speaker connected to the personal computer.

16. The method of claim 15 wherein the multi-item display is a monitor coupled to the personal computer.

17. A telephone switching system with a voice mail box for a called party's extension, which system may transmit to the called party a voice mail message being left by a caller while the called party is using a first communication channel for a call with a third party and may allow the called party to cause the system to interrupt the caller, comprising:

(a) means for connecting the caller to the voice mail box, (b) means for receiving voice sounds of the voice mail message from the caller, (c) means for recording the voice sounds in the mail box, (d) means for, while the voice sounds are being recorded, transmitting at least part of the voice sounds to the called party via a second communication channel, (e) means for receiving from the called party via the second communication channel a command to interrupt the caller leaving a message, and (f) means for interrupting the caller leaving a message with one of (i) a connection to the called party or (ii) a recorded greeting offering to connect the caller to the called party.

18. The system of claim 17 wherein the system further comprises means for notifying the called party that the system is receiving and recording voice sounds of the voice mail message from the caller and means for awaiting a command from the called party before transmitting at least part of the voice sounds to the called party.

19. The system of claim 17 wherein the second communication channel comprises a connection to a personal computer at the location of the called party and the voice sounds are played to the called party via a speaker connected to the personal computer.

20. The system of claim 17 further comprising:

(a) means for, while the called party is using the first communication channel for a call with a third party and voice sounds of the first caller are being transmitted to the called party, receiving a call from a second caller, receiving second voice sounds of a voice mail message from the second caller and recording the second voice sounds in the mail box, and (b) means for, after at least part of the voice sounds of the first caller have been transmitted to the called party, transmitting to the called party at least part of the second voice sounds being left by the second caller.

21. The system of claim 20 further comprising:

(a) means for receiving from the called party via the second communication channel a selection between the first caller leaving a message and the second caller leaving a message as to which caller should be interrupted.

22. A telephone switching system with a voice mail box for a called party's extension, which system transmits to the called party a voice mail message being left by a caller while the called party is using the extension for a call with a third party, comprising:

(a) means for connecting the caller to the voice mail box, (b) means for transmitting to the called party a signal that a message is being recorded in the voice mail box, (c) means for receiving voice sounds of the voice mail message from the caller and recording the voice sounds in the mail box, (d) means for receiving from the called party a command to put the third party on hold, (e) means for putting the third party on hold, (f) means for, while the voice sounds are being recorded, transmitting at least part of the voice sounds to the called party;

(g) means for receiving a call from a second caller, connecting the second caller to the voice mail box, and transmitting to the called party a second signal that a message is being recorded in the voice mail box, and (h) means for transmitting to the called party at least part of the voice sounds of the second caller.

23. A telephone switching system with a voice mail box for a called party's extension, which system transmits to the called party, with a delay, a voice mail message being left by a caller, comprising:

(a) means for receiving voice sounds of the voice mail message from the caller and recording the voice sounds in the mail box, (b) means for notifying the called party that the system is receiving and recording voice sounds of the voice mail message from the caller;

(c) means for awaiting a command from the called party before transmitting at least part of the voice sounds to the called party; and (d) means for, while the voice sounds are being recorded, but with a delay of more than 1 second from the time that the voice sounds were received from the caller, playing at least part of the recorded voice sounds to the called party.

24. The system of claim 23 wherein the system includes a connection to a personal computer at the location of the called party and means for playing at least part of the voice sounds to the called party via a speaker connected to the personal computer.

25. The system of claim 23 further comprising:

(a) means for, while voice sounds of the caller are being transmitted to the called party, receiving a call from a second caller, receiving second voice sounds of a voice mail message from the second caller, recording the second voice sounds in the mail box, and (b) means for, after at least part of the voice sounds of the first caller have been transmitted to the called party, transmitting to the called party at least part of the second voice sounds being left by the second caller.

26. A telephone switching system with a voice mail box for a called party's extension, which system transmits to the called party, with a delay which shrinks over time, at least part of a voice mail message being left by a first caller, comprising:

(a) means for receiving voice sounds of the voice mail message from the caller and recording the voice sounds in the mail box, and (b) means for, beginning with a substantial delay from the time that the voice sounds were received from the caller, playing at least part of the recorded voice sounds to the called party at a rate faster than they were recorded, thereby reducing the delay as the message is played, at the same time that the voice sounds are being received.

27. The system of claim 26 wherein the system further includes means for notifying the called party that the system is receiving and recording voice sounds of the voice mail message from the caller and means for awaiting a command from the called party before transmitting at least part of the voice sounds to the called party.

28. The system of claim 26 wherein the system is connected to a personal computer at the location of the called party and includes means for playing at least part of the voice sounds to the called party via a speaker connected to the personal computer.

29. The system of claim 26 further comprising:

(a) means for, while voice sounds of the first caller are being transmitted to the called party, receiving a call from a second caller, receiving second voice sounds of a voice mail message from the second caller, and recording the second voice sounds in the mail box, and (b) means for, after at least part of the voice sounds of the first caller have been transmitted to the called party, transmitting to the called party at least part of the second voice sounds being left by the second caller.

30. A telephone switching system with a voice mail box for a called party with an extension, which extension includes a multi-item display, which system transmits to the called party a voice mail message left by a caller, comprising:

(a) means for receiving a plurality of calls directed to the called party's extension, including a first call from a first caller and a second call from a second caller, and, for each of the plurality of calls, transmitting to the called party's extension's display items identifying the call, (b) means for connecting the first call to the called party's extension, (c) means for connecting the second call to the called party's voice mail box, (d) means for receiving a set of voice sounds of the voice mail message from the second caller, recording the set of voice sounds in the mail box, and storing in a memory an association between the set of voice sounds and the items displayed on the called party's extension's display for the call from the second caller, (e) means for displaying on the called party's extension's display a list comprised of each of the items transmitted to the extension for each of the plurality of calls directed to the called party's extension, including the first call and the second call, (f) means for receiving at the called party's extension a selection by a user of the displayed items for the second call, and (g) means for transmitting the set of voice sounds corresponding to the selected items to the called party's extension.

31. The system of claim 30 wherein the system is connected to a personal computer at the location of the called party and the system includes means for playing at least part of the voice sounds to the called party via a speaker connected to the personal computer.

32. The system of claim 31 wherein the multi-item display is a monitor coupled to the personal computer.

33. The method of claim 7 wherein the delay is variable and the system adjusts the delay according to the time that playing of the voice sounds begins so that the voice sounds are played from their beginning.

34. The system of claim 23 further including means for varying the delay and means for adjusting the delay according to the time that playing of the voice sounds begins so that the voice sounds are played from their beginning.

* * * * *